US006325234B1

United States Patent
Legaspi

(10) Patent No.: US 6,325,234 B1
(45) Date of Patent: Dec. 4, 2001

(54) MICROWAVE DISH COVER

(76) Inventor: Christopher P. Legaspi, 221 Thompson Ave., Fullerton, CA (US) 92833

( * ) Notice: Subject to any disclaimer, the term of this patent is extended or adjusted under 35 U.S.C. 154(b) by 0 days.

(21) Appl. No.: 09/484,396

(22) Filed: Jan. 14, 2000

(51) Int. Cl.$^7$ .................................... H05B 6/80
(52) U.S. Cl. ............... 220/367.1; 220/369; 220/573.1; 220/574
(58) Field of Search ................. 220/367.1, 369, 220/573.1, 574, 731, 771

(56) References Cited

U.S. PATENT DOCUMENTS

| D. 297,298 | 8/1988 | Sarnoff et al. . | |
|---|---|---|---|
| 612,513 | * 10/1898 | Bowers | 220/369 |
| 2,002,237 | * 5/1935 | Roland | 220/369 |
| 2,814,381 | * 11/1957 | Stevick | 220/367.1 X |
| 3,448,888 | 6/1969 | Smith et al. . | |
| 4,795,056 | 1/1989 | Meyers . | |
| 5,012,061 | 4/1991 | Lesser . | |
| 5,065,889 | * 11/1991 | Conti | 220/574 X |
| 5,302,791 | 4/1994 | Meyers et al. . | |
| 5,750,967 | * 5/1998 | Sprauer, Jr. | 220/367.1 X |
| 6,105,810 | * 8/2000 | Daenen et al. | 220/369 X |

* cited by examiner

Primary Examiner—Steven Pollard

(57) ABSTRACT

A microwave dish cover for preventing splattering and wasting of food being cooked in a microwave oven. The microwave dish cover includes a cover member having a top wall which includes a centrally-disposed recessed portion and a plurality of holes extending therethrough, the cover member also having a side wall which is slanted outwardly from the top wall to an open bottom; and also includes a lift handle member which is integrally disposed in the recessed portion, and further includes a pair of side handle members which are integrally and oppositely attached to the exterior of the side wall. The dish cover is adapted to cover completely over any type of dish including a plate, a bowl, and a glass.

3 Claims, 2 Drawing Sheets

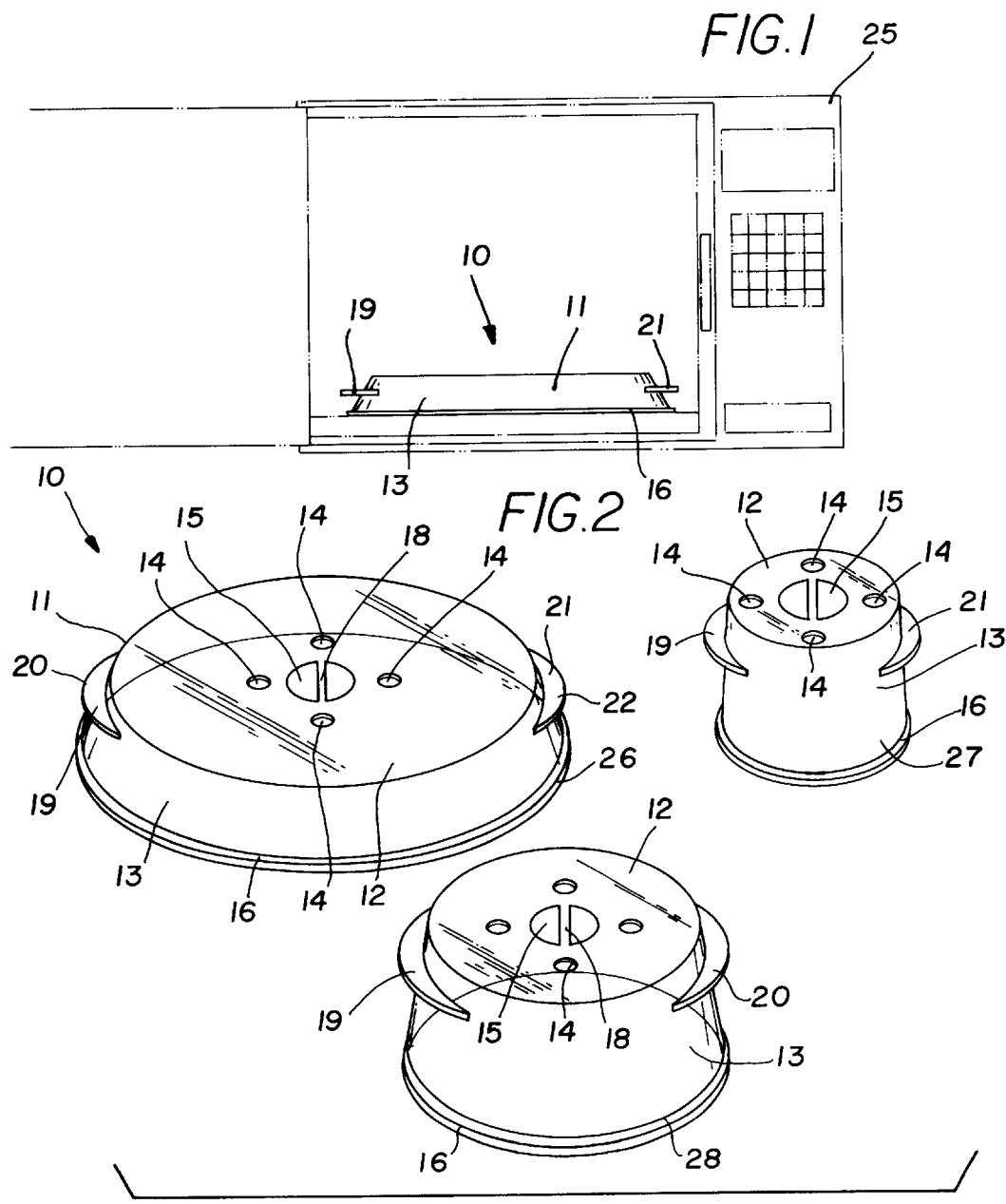

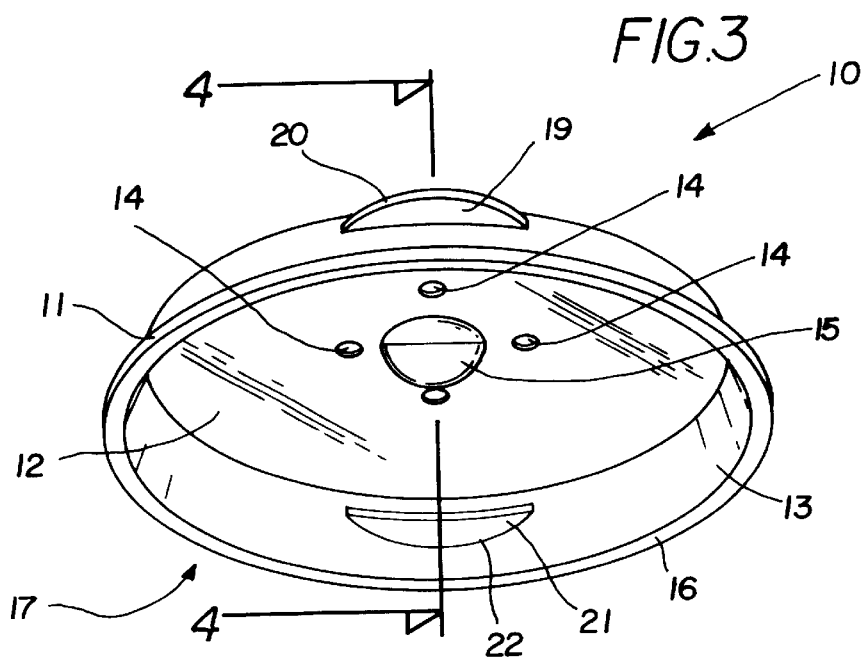
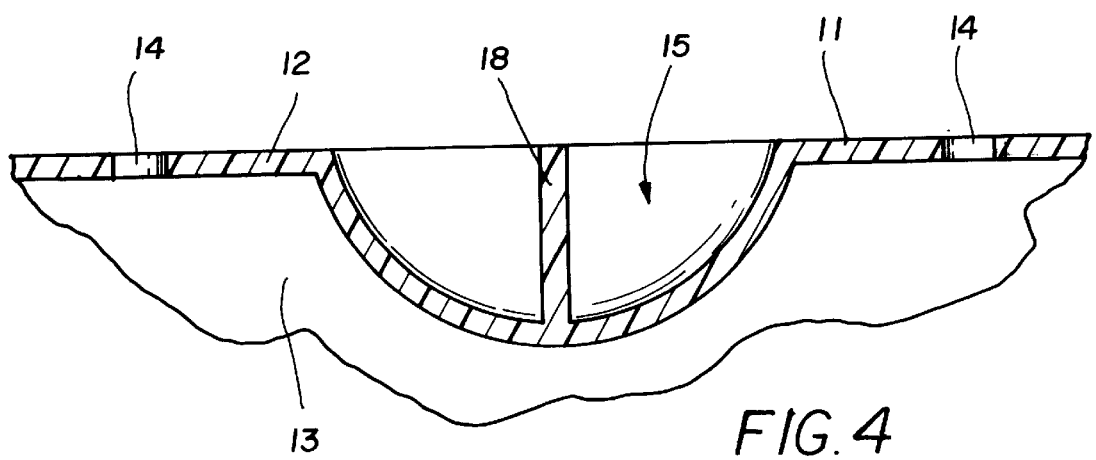

MICROWAVE DISH COVER

BACKGROUND OF THE INVENTION

1. Field of the Invention

The present invention relates to a dish guard for a microwave and more particularly pertains to a new microwave dish cover for preventing splattering and wasting of food being cooked in a microwave oven.

2. Description of the Prior Art

The use of dish guard for a microwave is known in the prior art. More specifically, dish guard for a microwave heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,795,056; U.S. Pat. No. 3,448,888; U.S. Pat. No. 5,302,791; U.S. Pat. No. 5,012,061; U.S. Pat. No. Des. 297,298.

While these devices fulfill their respective, particular objectives and requirements, the aforementioned patents do not disclose a new microwave dish cover. The inventive device includes a cover member having a top wall which includes a centrally-disposed recessed portion and a plurality of holes extending therethrough, the cover member also having a side wall which is slanted outwardly from the top wall to an open bottom; and also includes a lift handle member which is integrally disposed in the recessed portion, and further includes a pair of side handle members which are integrally and oppositely attached to the exterior of the side wall. The dish cover is adapted to cover completely over any type of dish including a plate, a bowl, and a glass.

In these respects, the microwave dish cover according to the present invention substantially departs from the conventional concepts and designs of the prior art, and in so doing provides an apparatus primarily developed for the purpose of preventing splattering and wasting of food being cooked in a microwave oven.

SUMMARY OF THE INVENTION

In view of the foregoing disadvantages inherent in the known types of dish guard for a microwave now present in the prior art, the present invention provides a new microwave dish cover construction wherein the same can be utilized for preventing splattering and wasting of food being cooked in a microwave oven.

The general purpose of the present invention, which will be described subsequently in greater detail, is to provide a new microwave dish cover which has many of the advantages of the dish guard for a microwave mentioned heretofore and many novel features that result in a new microwave dish cover which is not anticipated, rendered obvious, suggested, or even implied by any of the prior art dish guard for a microwave, either alone or in any combination thereof.

To attain this, the present invention generally comprises a cover member having a top wall which includes a centrally-disposed recessed portion and a plurality of holes extending therethrough, the cover member also having a side wall which is slanted outwardly from the top wall to an open bottom; and also includes a lift handle member which is integrally disposed in the recessed portion, and further includes a pair of side handle members which are integrally and oppositely attached to the exterior of the side wall. The dish cover is adapted to cover completely over any type of dish including a plate, a bowl, and a glass.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new microwave dish cover which has many of the advantages of the dish guard for a microwave mentioned heretofore and many novel features that result in a new microwave dish cover which is not anticipated, rendered obvious, suggested, or even implied by any of the prior art dish guard for a microwave, either alone or in any combination thereof.

It is another object of the present invention to provide a new microwave dish cover which may be easily and efficiently manufactured and marketed.

It is a further object of the present invention to provide a new microwave dish cover which is of a durable and reliable construction.

An even further object of the present invention is to provide a new microwave dish cover which is susceptible of a low cost of manufacture with regard to both materials and labor, and which accordingly is then susceptible of low prices of sale to the consuming public, thereby making such microwave dish cover economically available to the buying public.

Still yet another object of the present invention is to provide a new microwave dish cover which provides in the apparatuses and methods of the prior art some of the advantages thereof, while simultaneously overcoming some of the disadvantages normally associated therewith.

Still another object of the present invention is to provide a new microwave dish cover for preventing splattering and wasting of food being cooked in a microwave oven.

Yet another object of the present invention is to provide a new microwave dish cover which includes a cover member having a top wall which includes a centrally-disposed recessed portion and a plurality of holes extending therethrough, the cover member also having a side wall which is slanted outwardly from the top wall to an open bottom; and also includes a lift handle member which is integrally disposed in the recessed portion, and further includes a pair of side handle members which are integrally and oppositely attached to the exterior of the side wall. The dish cover is adapted to cover completely over any type of dish including a plate, a bowl, and a glass.

Still yet another object of the present invention is to provide a new microwave dish cover that eliminates the hassle of having to clean up the microwave oven.

Even still another object of the present invention is to provide a new microwave dish cover that eliminates having to wrap the food with paper towels and plastic wraps which often stick to the food.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevatioal view of a new microwave dish cover according to the present invention and being put to use.

FIG. 2 is a top perspective view of the present invention.

FIG. 3 is a bottom perspective view of the present invention.

FIG. 4 is a side cross-sectional view of the present invention.

DESCRIPTION OF THE PREFERRED EMBODIMENT

With reference now to the drawings, and in particular to FIGS. 1 through 4 thereof, a new microwave dish cover embodying the principles and concepts of the present invention and generally designated by the reference numeral 10 will be described.

As best illustrated in FIGS. 1 through 4, the microwave dish cover 10 generally comprises a cover member 11 having a top wall 12, a side wall 13, an open bottom 17, a plurality of holes 14 extending through the top wall 12, and a rim member 16 integrally attached to and extending along a bottom edge of the side wall 13. The cover member 11 is adapted to cover over a dish 26–28. The side wall 13 is angled relative to the top wall 12 and is slanted outwardly from the top wall 12 to the open bottom 17 such that the open bottom 17 has a greater diameter than that of the top wall 12. The top wall 12 includes a centrally-disposed recessed portion 15 which is semi-circular in shape. The cover member 11 is adapted to cover completely over any type of dish including a plate 26, a bowl 28, and a glass 27 with the cover member 11 being adapted to receive a top portion of the glass 27 through the open bottom 17 of the cover member 11. A lift handle member 18 is securely and integrally disposed in the top wall 12 with the lift handle member 18 being securely disposed in the centrally-disposed recessed portion 15 and extending upwardly therefrom. A pair of side handle members 19,21 are securely and integrally attached to the side wall 13 and are oppositely attached to an exterior of the side wall 13 near a top thereof. Each of the side handle members 19,21 has an arcuate outer edge 20,22 with the microwave dish cover 10 being made of plastic.

In use, the user places the dish 26–28 having food thereon in a microwave oven 25 for heating, and then places the microwave dish cover 10 over the dish for sanitary purposes to prevent splattering of food all over the microwave oven 25. The holes 14 in the top wall 12 of the cover member 11 allows air to the food being cooked. Once finished, the user can remove the microwave dish cover 10 by grasping the side handle members 19,21.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A microwave dish cover comprising:

a cover member having a top wall, at least one side wall, an open bottom, a plurality of holes extending through said top wall, a rim member integrally attached to and extending along a bottom edge of said at least one side wall, and being adapted to cover over a dish said at least one side wall being angled relative to said top wall, said at least one side wall being slanted outwardly from said top wall to said open bottom such that said open bottom has a greater diameter than that of said top wall, said top wall including a centrally-disposed recessed portion which is semi-circular in shape, said cover member being adapted to cover completely over any type of dish including a plate, a bowl, and a glass, said cover member being adapted to receive a top portion of the glass through said open bottom of said cover member;

a lift handle member being securely disposed in said top wall, said lift handle member being securely disposed in said centrally-disposed recessed portion and extending upwardly therefrom; and a pair of side handle members securely attached to said at least one side wall and being integrally and oppositely attached to an exterior of said at least one side wall near a top thereof such that hands of a user gripping said side handle members are positioned away from said bottom edge to minimize any chance of the hands being burned by steam exiting from under said bottom edge of said side wall when said cover member is lifted, said side handle members being attached near a top of said side wall, each of said side handle members having an arcuate outer edge, said microwave dish cover being made of plastic.

2. A microwave dish cover comprising:

a cover member having a top wall, at least one side will, an open bottom a plurality of holes extending through said top wall, a rim member integrally attached to and extending along a bottom edge of said at least one side wall, and being adapted to cover over a dish;

a lift handle member being securely disposed in said top wall;

a pair of side handle members securely attached to said at least one side wall; and wherein said Side handle members are integrally and oppositely attached to an exterior of said at least one side wall away from said bottom edge such that hands of a user gripping said side handle members are positioned away from said bottom edge to minimize any chance of the hands being burned by steam exiting from under said bottom edge of said side wall when said cover member is lifted;

wherein said side handle members are attached at or above a midpoint between said bottom edge and said top wall.

3. A microwave dish cover comprising:

a cover member having a top wall, at least one side wall, an open bottom, a plurality of holes extending through said top wall, a rim member integrally attached to and extending along a bottom edge of said at least one side wall, and being adapted to cover over a dish;

a lift handle member being securely disposed in said top wall;

a pair of side handle members securely attached to said at least one side wall; and wherein said side handle members are integrally and oppositely attached to an exterior of said at least one side wall away from said bottom edge such that hands of a user gripping said side handle members are positioned away from said bottom edge to minimize any chance of the hands being burned by steam exiting from under said bottom edge of said side wall when said cover member is lifted;

wherein said top wall defines a plane and said lift handle member does not extend above said plane.

* * * * *